United States Patent Office 2,962,476
Patented Nov. 29, 1960

2,962,476

POLYMERIZED ALKYL VINYL ETHERS OF IMPROVED STABILITY

Robert M. Verburg, North Plainfield, N.J., assignor to General Aniline & Film Corporation, New York, N.Y., a corporation of Delaware No Drawing. Filed Nov. 30, 1956, Ser. No. 625,227

6 Claims. (Cl. 260—45.85)

The invention here presented is a new and useful composition of matter in the form of an alkyl vinyl ether polymer to which there is added, at various stages during the polymerization, a sequestering agent, which may be organic or inorganic as desired, to improve the stability, durability and other physical properties of the resulting polymer.

Highly valuable synthetic resins have been prepared from a considerable range of the alkyl vinyl ethers of which the methyl vinyl ether, the ethyl vinyl ether, the n-butyl vinyl ether, isobutyl vinyl ether, stearyl vinyl ether are representative of a considerable range of substances which undergo vinyl polymerization to yield excellent resins having a considerable range of detailed properties, but all being obtainable as highly viscous fluids subject to further polymerization into clear, usually water-white solids of very valuable properties for many uses including molding resins, paint, lacquer and enamel resins, electrical insulation, non vitreous windows and the like. However all of these resins are subject, as ordinarily prepared, to discoloration from the effect of heat. In the past attempts have been made to counteract the discoloring tendency by addition to the resin of anti-oxidants and similar stabilizers. These materials cannot be added to the original monomers since they interfere with the polymerization reaction, and it is extremely difficult to incorporate them into the finished polymer because of the very high viscosity of the polymer and the damage done to the polymer by the mechanical working which is necessary to incorporate such substances into the polymers.

According to the present invention it is found possible to eliminate the formation of color upon heating these otherwise colorless polymers, by the addition to the monomer of a sequestering agent. Sequestering agents in general are unexpectedly found not to interfere with the polymerization as distinguished from prior used "stabilizers," and they not only markedly increase the resistance of the polymer to heat breakdown and heat discoloration, but they also permit the preparation of high viscosity polymers which have a resistance to viscosity reduction as a consequence of heat or mechanical working and similar treatments.

It is found that the sequestering agent may be applied in several ways, and its effectiveness is not significantly modified by the point of application. That is, when the alkyl vinyl ethers are polymerized in bulk by the aid of an acid or Friedel-Crafts type catalyst, the sequestering agent may be added directly to the bulk monomers without injury to the polymerization reaction or to the resulting polymer, and the resistance of the finished polymer is outstandingly improved, as above pointed out. Similarly if the alkyl vinyl ethers are polymerized in a solvent such as propane, butane, pentane and the like, or other inert solvents, the sequestering agent may be added to the solution and, upon polymerization, an adequate amount of the sequestering agent appears in the finished polymer.

Similarly, excellent results are obtained by adding to the alkaline quench, normally used at the end of a polymerization reaction, an appropriate amount of sequestering agent. This procedure does not put as much of the sequestering agent into the finished polymer as can be done by other methods, but the amount incorporated is sufficient to give a substantial improvement in the resistance of the polymer to heat breakdown and to injury by mechanical working.

Thus the invention broadly consists of a composition of matter in the form of an alkyl vinyl ether polymer containing an organic or inorganic sequestering agent. As examples of organic sequestering agents can be cited salts of ethylene diamine tetra acetic acid, salts of hydroxy ethyl ethylene diamine triacetic acid, and derivatives of polyethylene polyamines polyacetic acid. These compounds are preferably used as sodium salts but equally well may be potassium or iron or zinc or aluminum or magnesium salts as desired. As examples of inorganic sequestering agents can be cited potassium pyrophosphate or sodium polyphosphate or the like. These phosphate compounds are given as representative of a considerable group of other sequestering agents which are well known to those skilled in the art. Accordingly this invention protects alkyl vinyl ether polymers in general, effectively and efficiently against heat discoloration, and from breakdown from heat or mechanical working. Other objects and details of the invention will be apparent from the following description.

The primary raw material for the composition of matter of the present invention is an alkyl vinyl ether which, as above pointed out, may be a methyl, ethyl, n-butyl, isobutyl, propyl, hexyl, heptyl, stearyl and the like, or vinyl ethers in general. It is universally accepted that the polymerization of alkyl vinyl ethers is a general reaction which is applicable to all which can be manufactured.

The second item of the invention is a polymerization catalyst. Some of these alkyl vinyl ethers polymerize readily merely in the presence of light, especially ultraviolet light, and others, probably all, polymerize readily in the presence of a Friedel-Crafts catalyst or an acid catalyst. The preferred Friedel-Crafts catalysts are boron trifluoride and aluminum chloride. All of the accepted Friedel-Crafts catalysts, most of which are halides, are effective for the polymerization.

The third component of the invention then is a sequestering agent, which is represented by the sodium salt of ethylene diamine tetra acetic acid, under the commercial trade-name of Nullapon B; or potassium pyrophosphate; or sodium polyphosphate under the trade-name of Calgon, and the like. The sequestering agent may, as above pointed out, be added to the original monomer with or without a solvent for the alkyl vinyl ether, or may be added with the quenching agent to the finished polymer.

The following examples are offered as showing the best way now known of practicing the invention but are not intended to limit the claims in any way.

EXAMPLE 1

*Case A.*—To 25 ml. of isobutyl vinyl ether was added 0.07 grams of Nullapon B. Sufficient of a 3 percent solution boron trifluoride dihydrate in dioxane was added to initiate polymerization.

*Case B.*—A second polymerization was performed in an identical manner, however the Nullapon B was not added.

Upon completion of the polymerization and permitting the samples to stand for one hour, both samples were divided in half and heated at 100° C. for 16 hours. The specific viscosity of the heated and unheated samples 1% in benzene) were determined and are noted in Table 1.

TABLE 1

*Effect of heat on polymerized isobutyl vinyl ether Sequestering agent added*

| | Specific Viscosity | | Color | |
|---|---|---|---|---|
| | Before Heating | After Heating | Before Heating | After Heating |
| Case A, Nullapon B | 0.27 | 0.23 | Clear | Clear. |
| Case B, Blank | 0.27 | 0.19 | ___do___ | Yellow-Brown. |

EXAMPLE 2

To 25 ml. of isobutyl vinyl ether was added sufficient 1% $BF_3 \cdot 2H_2O$ in dioxane to cause polymerization.

To 25 ml. of isobutyl vinyl ether was added 0.03 gram of potassium pyrophosphate and sufficient 1% $BF_3 \cdot 2H_2O$ in dioxane to cause polymerization.

To 25 ml. of isobutyl vinyl ether was added 0.03 gram of Calgon and sufficient 1% $BF_3 \cdot 2H_2O$ in dioxane to cause polymerization.

Table 2 summarizes the effect on the color of the polymer upon heating the samples for 24 hours at 100° C. and 7 hours at 140° C. in vacuo.

TABLE 2

*Effect on color of polymer upon heating in vacuo for 24 hrs. at 100° C. and 7 hrs. at 140° C.*

| Sample No. | Color | |
|---|---|---|
| | Unheated | Heated |
| 6866 Blank | Clear | Orange and Black. |
| 6867 $K_4P_2O_7$ | ___do___ | Clear. |
| 6860 Calgon | ___do___ | Light Yellow. |

EXAMPLE 3

The reactor was a 55 gallon Heresite-lined drum. The drum was precooled by adding crushed Dry-Ice to the drum, and the iced drum was permitted to stand 15–20 minutes. The Dry-Ice was discharged and to the drum was charged 3,500 grams of liquid propane.

Into a stainless steel breaker was charged 1,500 grams of liquid propane. To this was added 13 grams of gaseous boron trifluoride.

To the drum containing the 3,500 grams of propane was added 2,000 grams of isobutyl vinyl ether containing 5 grams of polymer anti-oxidant stabilizer 2,6-di-tertiary butyl para cresol and one gram of Nullapon B.

The boron trifluoride-propane solution was rapidly poured into the monomer-propane stabilizer-Nullapon B mixture with instantaneous polymerization resulting.

After permitting the reaction mass to degas, the mass was quenched with 15 gallons of water (to cover the polymer) to which had been added 75 ml. of concentrated (28%) ammonium hydroxide.

An identical run was performed with the exception that the Nullapon B was not added.

Samples were obtained two hours after quenching and heated at 100° C. for 16 hours. The polymer prepared in the presence of Nullapon B was colorless after heating, whereas the polymer prepared in the absence of Nullapon B was yellow in color after heating.

EXAMPLE 4

Isobutyl vinyl ether was polymerized in the same manner and same quantity as in Example 3 above.

Three polymerizations were performed as indicated below by the respective run numbers.

| Run Number | Added to Monomer |
|---|---|
| 524 | Blank. |
| 544 | 5 g. $K_4P_2O_7$. |
| 545 | 5 g. Calgon. |

The resulting polymer was quenched by washing each batch once with 30 gallons of water containing 4 ounces of concentrated ammonium hydroxide. The polymer was then sliced into relatively uniform size pieces and subsequently agitated in 30 gallons of water containing 8 ounces of concentrated ammonium hydroxide.

Samples of the polymer were then heated at 100° C. in air for 16 hours. The polymer not containing the sequestering agent turned brown in color upon heating, whereas both samples containing the sequestering agents remained colorless.

EXAMPLE 5

2,000 grams of isobutyl vinyl ether were polymerized in liquid propane as a diluent with boron trifluoride as the catalyst.

The resulting polymer was quenched with an ammonium hydroxide-water wash to destroy the catalyst.

*Run 489 Nullapon B.*—To the ammonium hydroxide-water quench was added 5 grams of Nullapon B.

*Run 488 Blank.*—Nothing was added to an identical ammonium hydroxide-water quench.

Samples were taken of the two polymers and these were heated at 145° C. and the samples observed at various intervals as indicated in Table 3.

TABLE 3

*Results of heating polymerized isobutyl vinyl ether at 145° C.*

| Run No. | 2 hours | 4 hours |
|---|---|---|
| 489 Nullapon B | Slight Color | Slight Flowing. |
| 488 Blank | Colored | 50% Fluid. |

The samples were heated an additional 2 hours and the intrinsic viscosity determined of an 0.2 percent solution of the polymer in benzene following the filtration of the solution to remove insoluble material.

Samples of the two polymers were also heated at 50° C. in vacuum for 16 hours and the intrinsic viscosity and insolubles determined.

The comparison in the viscosity and insolubles of the two polymers are summarized in Table 4.

TABLE 4

*Effect of heat on the viscosity and insolubles polymerized isobutyl vinyl ether 50° C.—16 hrs. vs. 145° C.—6 hrs.*

| Run No. | Viscosity, Percent Decrease | Insolubles, Percent Increase |
|---|---|---|
| 489 Nullapon B | 39 | 6 |
| 488 Blank | 46.5 | 29 |

EXAMPLE 6

Isobutyl vinyl ether was polymerized in the same manner as in Example 5 above.

*Run 524 Blank.*—No additive to quench of 4 ounces concentrated $NH_4OH$ in 20 gallons water.

*Run 538.*—Potassium pyrophosphate added (5 gms.) to the quench consisting of 4 ounces concentrated $NH_4OH$ in 20 gallons water.

*Run 539.*—Calgon (sodium hexametaphosphate) added (5 gms.) to the quench consisting of 4 ounces concentrated $NH_4OH$ in 20 gal. $H_2O$.

Following this quench the polymer was washed twice in a bath of 20 gallons of tap water.

Samples of the resulting polymer were then heated according to the procedure contained in Table 5.

TABLE 5

*Effect on color of polymer after heating*

| Run No. | 50° C. Vac., 16 hrs. | 100° C. Air, 24 hrs. | 150° C. 4 hrs. Air Fluidity [1] | Intrinsic Viscosity, 50° C. Sample |
|---|---|---|---|---|
| | | | Percent | |
| 524 Blank | Clear | Dark Brown | 50 | 2.9 |
| 538 K₄P₂O₇ | Brown Spot | Clear | 25 | 2.7 |
| 539 Calgon | Clear | do | 10 | 3.2 |

[1] Qualitative measurement visual.

The intrinsic viscosity of the samples showed little difference as to the effect of heat on the physical properties of the polymer.

Two additional washes of the polymer in 30 gallons of water to which was added 8 ounces of ammonia showed little effect as to improving the color of Run 524 Blank, when a sample was heated 32 hours at 100° C. in air. The two runs containing the sequestering agents, however, remained clear when treated in the same manner.

Thus the process of the invention effectively stabilizes alkyl vinyl polymers against heat and molecular weight breakdown by the application thereto of a sequestering agent.

While there are above disclosed but a limited number of embodiments of the process of the invention it is possible to provide still other embodiments without departing from the inventive concept herein disclosed, and it is therefore desired that only such limitations be imposed upon the appended claims as are stated therein or required by the prior art.

The invention claimed is:

1. In the process for the polymerization of vinyl alkyl ethers wherein a vinyl alkyl ether is polymerized under anhydrous conditions by the action of a Friedel-Crafts condensation catalyst, the improvement whereby the vinyl alkyl ether polymer which is obtained is stabilized against heat discoloration, which comprises incorporating in the material being polymerized a minor effective stabilizing amount of a sequestering agent selected from the group consisting of alkali metal salts of phosphoric acids and ethylene polyamine polyacetic acids.

2. The process as defined in claim 1 wherein the vinyl alkyl ether which is polymerized and whose polymer is obtained is selected from the group consisting of methylvinyl ether, ethylvinyl ether, n-butylvinyl ether, isobutyl vinyl ether and stearyl vinyl ether.

3. The process as defined in claim 2 wherein the Friedel-Crafts catalyst specified is boron fluoride.

4. The process as defined in claim 3 wherein the sequestering agent specified is the sodium salt of ethylene diamine tetra acetic acid.

5. The process as defined in claim 3 wherein the sequestering agent specified is potassium pyrophosphate.

6. The process as defined in claim 3 wherein the sequestering agent specified is sodium hexametaphosphate.

References Cited in the file of this patent

UNITED STATES PATENTS

| | | |
|---|---|---|
| 2,477,225 | Zoss | July 26, 1949 |
| 2,558,728 | Britton et al. | July 31, 1951 |
| 2,604,459 | Jankowiak | July 22, 1952 |
| 2,630,426 | Uraneck et al. | Mar. 3, 1953 |
| 2,654,679 | Goppels et al. | Oct. 6, 1953 |
| 2,667,522 | McElroy | Jan. 26, 1954 |
| 2,697,700 | Uraneck et al. | Dec. 21, 1954 |

OTHER REFERENCES

Schildneckt et al.: Industrial and Engineering Chemistry, February 1947, pages 180–186.